(12) United States Patent
Julsrud et al.

(10) Patent No.: US 9,463,982 B2
(45) Date of Patent: Oct. 11, 2016

(54) FOULING REDUCTION IN HYDROCHLOROSILANE PRODUCTION

(71) Applicant: REC Silicon Inc, Moses Lake, WA (US)

(72) Inventors: Stein Julsrud, Moses Lake, WA (US); Anja Olafsen Sjastad, Oslo (NO)

(73) Assignee: REC Silicon Inc, Moses Lake, WA (US)

(*) Notice: Subject to any disclaimer, the term of this patent is extended or adjusted under 35 U.S.C. 154(b) by 46 days.

(21) Appl. No.: 13/656,591

(22) Filed: Oct. 19, 2012

(65) Prior Publication Data

US 2013/0101489 A1    Apr. 25, 2013

Related U.S. Application Data

(60) Provisional application No. 61/549,701, filed on Oct. 20, 2011.

(51) Int. Cl.
*C01B 33/107* (2006.01)

(52) U.S. Cl.
CPC ..... *C01B 33/1071* (2013.01); *C01B 33/10731* (2013.01); *C01B 33/10778* (2013.01)

(58) Field of Classification Search
CPC ............ C01B 33/1071; C01B 33/10778
USPC ............................ 423/341, 342, 350
See application file for complete search history.

(56) References Cited

U.S. PATENT DOCUMENTS

| | | | |
|---|---|---|---|
| 4,165,363 A * | 8/1979 | Weigert et al. | ........... 423/342 |
| 4,321,246 A | 3/1982 | Sarma et al. | |
| 4,676,967 A | 6/1987 | Breneman | |
| 8,178,051 B2 | 5/2012 | Lord | |
| 8,518,352 B2 * | 8/2013 | Kamei et al. | ........... 422/630 |
| 2011/0110839 A1 | 5/2011 | Fahrenbruck et al. | |
| 2011/0229398 A1 | 9/2011 | Troll et al. | |
| 2012/0121493 A1 | 5/2012 | Nagai et al. | |

FOREIGN PATENT DOCUMENTS

| | | |
|---|---|---|
| JP | 11-049508 | 2/1999 |
| WO | WO 2006-098722 | 9/2006 |
| WO | WO 2011/018875 | 2/2011 |

OTHER PUBLICATIONS

International Search Report and Written Opinion issued in corresponding Application No. PCT/US2012/061150, Jan. 31, 2013, 7 pages.
Supplementary European Search Report, dated Jun. 23, 2015, issued in corresponding European Patent Application No. EP 12 841 203.8.
Office action dated Feb. 2, 2016, for U.S. Appl. No. 14/243,822, 10 pages.

* cited by examiner

*Primary Examiner* — Matthew E Hoban
*Assistant Examiner* — James Fiorito
(74) *Attorney, Agent, or Firm* — Klarquist Sparkman, LLP

(57) ABSTRACT

Embodiments of a method for reducing iron silicide and/or iron phosphide fouling and/or corrosion in a hydrochlorosilane production plant are disclosed. Sufficient trichlorosilane is included in a silicon tetrachloride process stream to minimize hydrogen chloride formation, thereby inhibiting iron (II) chloride formation and reducing iron silicide and/or iron phosphide fouling, superheater corrosion, or a combination thereof.

19 Claims, 2 Drawing Sheets

FOULING REDUCTION IN HYDROCHLOROSILANE PRODUCTION

CROSS REFERENCE TO RELATED APPLICATION

This claims the benefit of U.S. Provisional Application No. 61/549,701, filed Oct. 20, 2011, which is incorporated in its entirety herein by reference.

FIELD

This disclosure concerns embodiments of a method for reducing fouling in hydrochlorosilane production plants.

SUMMARY

A hydrohalosilane production plant includes components such as a silicon tetrahalide superheater and a hydrogenation reactor. One or more production plant components may include iron. Additionally, silicon feedstock may include a trace amount of iron. Iron silicide fouling and corrosion in the hydrohalosilane production plant is reduced by including a sufficient concentration of trihalosilane in a silicon tetrahalide process stream to minimize hydrogen halide formation, thereby inhibiting iron halide formation and reducing superheater corrosion, iron silicide and/or iron phosphide fouling of production plant components (e.g., the hydrogenation reactor), or a combination thereof.

In one embodiment, the production plant is a hydrochlorosilane production plant, and the method includes determining a partial pressure of HCl present in a silicon tetrachloride (STC) process stream, determining a concentration of trichlorosilane (TCS) sufficient to minimize HCl formation, and adding the determined concentration of TCS to the STC process stream, thereby minimizing the HCl formation and subsequent fouling and/or corrosion. The TCS may be added to the STC process stream upstream of the silicon tetrachloride superheater. In another embodiment, the method includes obtaining the STC process stream from a silicon tetrachloride distillation column operating under distillation conditions suitable to provide a distillate comprising STC and a sufficient concentration of TCS. In some embodiments, the TCS concentration is 0.2 mol % to 2 mol %, such as 0.5 mol % to 1.5 mol %, or 0.9 mol % to 1.1 mol %.

The foregoing and other objects, features, and advantages of the invention will become more apparent from the following detailed description, which proceeds with reference to the accompanying figures.

DETAILED DESCRIPTION

Silicon tetrahalides (e.g., silicon tetrachloride) are hydrogenated to produce hydrohalosilanes and silanes. See, e.g., U.S. Pat. No. 4,676,967 and International Publication No. WO 2006/098722. A hydrohalosilane production plant comprises components including a silicon tetrahalide superheater and a hydrogenation reactor. Alloys used in the construction of the production plants typically are iron-based. Iron also may be present as a trace component (e.g., less than 1% (w/w), or less than 0.1% (w/w)) in silicon feedstock used in the production plant.

The temperature in a silicon tetrahalide superheater is sufficient to produce significant vapor pressures of iron halides when the activity of halides is high. For example, in a silicon tetrachloride superheater, significant iron (II) chloride vapor pressures are produced at typical operating temperatures.

Figure 1:
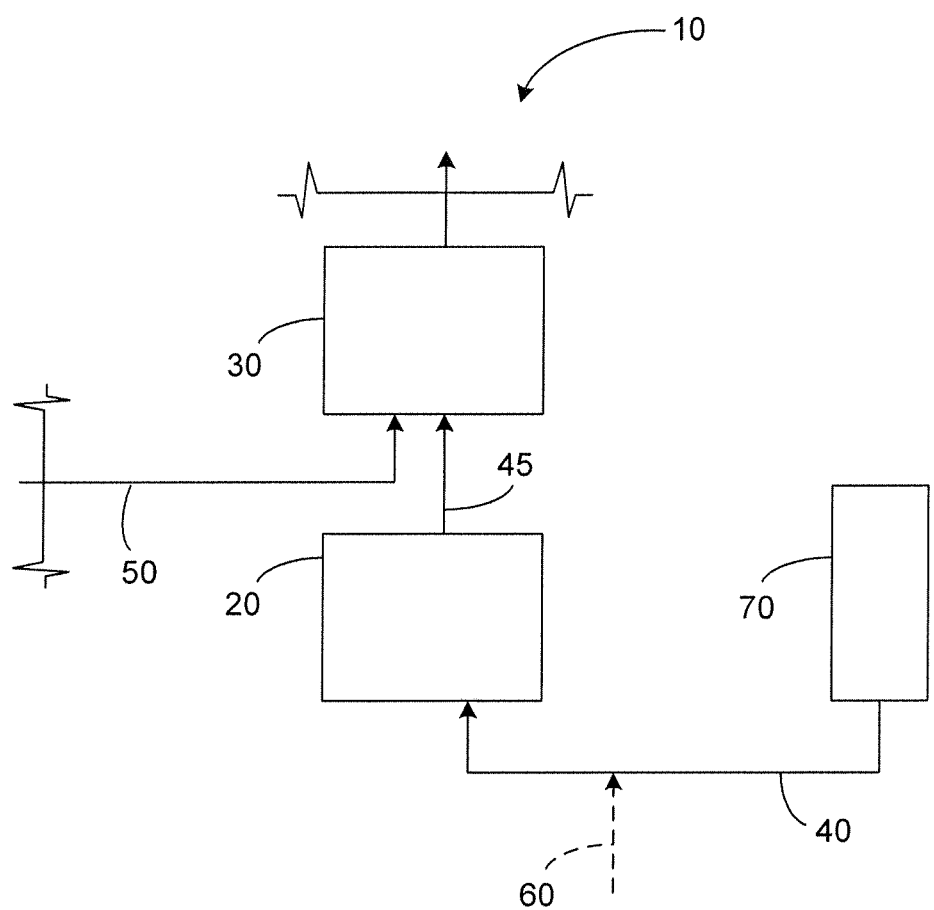
FIG. 1 is a schematic flow diagram of a hydrochlorosilane production plant.

With reference to FIG. 1, a hydrochlorosilane production plant 10 comprises a silicon tetrachloride (STC) superheater 20 and a hydrogenation reactor 30. If a silicon tetrachloride process stream 40 is pure or includes any HCl, $FeCl_2$ vapor is produced as iron in the superheater walls reacts with chloride ions. Iron also may be present in the STC process stream 40 when STC is made from silicon feedstock including a trace amount of iron. The STC process stream 40 further may include hydrogen. In the STC superheater 20, STC reacts with hydrogen to produce trichlorosilane and hydrogen chloride.

$$SiCl_{4(g)} + H_{2(g)} \leftrightarrow HSiCl_{3(g)} + HCl_{(g)} \qquad (1)$$

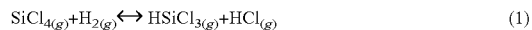

Hydrogen chloride can react with iron present in the STC feed and/or in iron alloys within the superheater 20 to produce iron (II) chloride.

$$2HCl_{(g)} + Fe_{(s)} \rightarrow FeCl_{2(s)} + H_{2(g)} \qquad (2)$$

Under some conditions, iron (II) chloride reacts with STC and hydrogen to produce iron silicide.

$$SiCl_{4(g)} + FeCl_{2(s)} + 3H_{2(g)} \leftrightarrow FeSi_{(s)} + 6HCl_{(g)} \qquad (3)$$

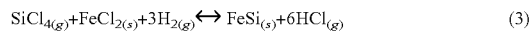

Iron silicide deposits in the superheater 20 and can form a passivating layer on the superheater walls, thereby suppressing subsequent iron (II) chloride formation over time.

However, in the presence of excess HCl, the equilibrium in equation (3) shifts to the left, increasing the concentration of $FeCl_2$ in the superheater 20. $FeCl_2$ has a significant vapor pressure at the operating temperature in the superheater 20. Thus, as the amount of $FeCl_2$ increases, the concentration of $FeCl_2$ vapor also increases. The $FeCl_2$ vapor then is transported with the heated STC process stream 45 to other areas of the reactor. For example, the $FeCl_2$ vapor may be transported with the heated STC process stream 45 to a distributor plate area in a hydrogenation reactor 30 where iron silicides and/or phosphides (if phosphine or other phosphorus-based compounds are present in the process stream) can form when the silicon tetrachloride process stream 40 and a hydrogen process stream 50 are mixed in the hydrogenation reactor 30. Deposition of iron silicides and/or phosphides leads to fouling of the distributor orifices and disruption of production runs. Formation of $FeCl_2$ vapor also causes corrosion of the superheater 20. To a lesser extent, high chloride activities may lead to transport of other alloy elements besides iron. Over the long term, such materials transport and the resulting fouling and/or corrosion may reduce the lifetime of the silicon tetrachloride superheater 20 and/or the hydrogenation reactor 30.

Fouling and/or corrosion are reduced or prevented by maintaining appropriate partial pressures and concentrations associated with HCl, such that there is not an excessive HCl concentration permitting the formation of iron (II) chloride. Desirably, the concentration of HCl in the STC process steam is minimized, thereby driving the equilibrium in equation (3) to the right and minimizing or preventing $FeCl_2$ formation.

In some embodiments, adding trichlorosilane (TCS) 60 to the STC process stream 40 and/or maintaining TCS in the STC process stream reduces the activity of the chlorides while increasing the activity of silicides in the STC superheater 20 (and other places in the process stream), thereby reducing or preventing fouling. The presence of TCS in the STC process stream reacts with HCl and reduces the HCl partial pressure.

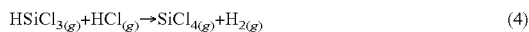

Reduction of HCl in turn reduces the extent of the reaction in equation (2) and shifts the equilibrium in equation (3) to the right, thereby reducing the amount of $FeCl_2$ produced or even preventing $FeCl_2$ formation.

Figure 2:
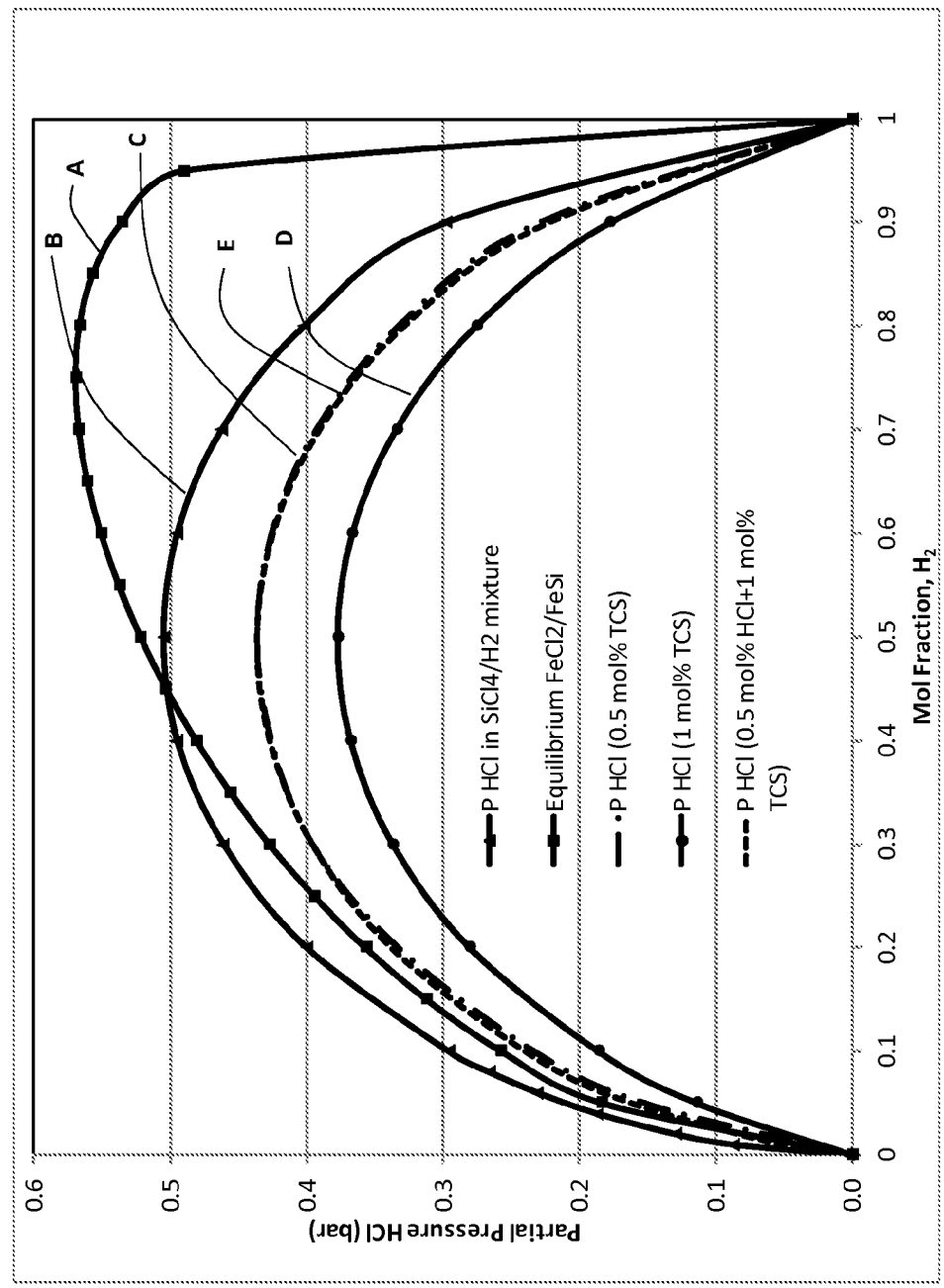
FIG. 2 is a graph of HCl partial pressure versus $H_2$ fraction illustrating the $FeCl_2$-FeSi transition as the $H_2/SiCl_4$ ratio, HCl partial pressure, and trichlorosilane content vary.

FIG. 2 is a graph illustrating the relationship between $FeCl_2$—FeSi during the reaction shown in equation (3), with regard to the $H_2/SiCl_4$ ratio, HCl content, and TCS content of the process stream. The data in FIG. 2 was obtained at a total pressure of 30 bar, and a temperature of 823K. With reference to FIG. 2, curve A indicates the division between $FeCl_2$ and FeSi phases within the superheater. At a given $H_2$ fraction, if the HCl partial pressure is above curve A, $FeCl_2$ predominates. If the HCl partial pressure is below curve A, FeSi predominates. Curve B represents the partial pressure of HCl in a STC/$H_2$ mixture as a function of the $H_2$ fraction. For example, when the $H_2$ fraction is 0.1, the partial pressure of HCl is ~0.3; when the $H_2$ fraction is 0.7, the partial pressure of HCl is ~0.45.

Fouling and/or corrosion are reduced or eliminated by maintaining reaction conditions such that the HCl partial pressure curve (e.g., curve B) is below curve A. When the HCl partial pressure curve is below curve A, there is less HCl available to react with iron in the superheater alloys (equation (2)), and the equilibrium in equation (3) also is shifted to the right, favoring FeSi formation over $FeCl_2$ formation. As shown in FIG. 2, whenever the $H_2$ fraction is less than 0.4, curve B (the partial pressure of HCl) is above curve A, indicating undesirable operating conditions.

Providing TCS in the STC superheater lowers the HCl partial pressure as TCS reacts with HCl (equation (4)). For example, when 0.5 mol % TCS is added to the superheater, the HCl partial pressure is represented by curve C. As seen in FIG. 2, addition of 0.5 mol % TCS lowers the entire HCl partial pressure curve relative to curve B (absence of TCS). At hydrogen fractions from 0.2-1, curve C is below curve A and operating conditions are favorable for minimizing or preventing $FeCl_2$ production.

Inclusion of 1 mol % TCS lowers the partial pressure of HCl even further as demonstrated by curve D. Curve D is below curve A at all concentrations of $H_2$. Thus, addition of 1 mol % TCS to the STC superheater strongly favors formation of FeSi over $FeCl_2$, thereby minimizing or preventing $FeCl_2$ formation.

In some embodiments, the HCl partial pressure varies in direct proportion to the amount of TCS added. When 0.5 mol % HCl and 1 mol % TCS are added to the STC superheater, the HCl partial pressure (curve E) is equivalent to the HCl partial pressure produced when 0.5 mol % TCS was added (curve C).

Reduction of $FeCl_2$ formation within the superheater in turn reduces transportation of $FeCl_2$ vapor to the distributor plate in the hydrogenation reactor where it can react to deposit iron silicide, thereby fouling the distributor orifices. However, inclusion of TCS reduces efficiency of the STC process. Thus, it is advantageous to minimize the TCS concentration while maintaining a concentration sufficient to effectively reduce and/or prevent fouling.

In some embodiments, TCS is added to and/or maintained in the STC process stream at a concentration of at least at least 0.2 mol %, at least 0.5 mol %, 0.2 mol % to 2 mol %, 0.5 mol % to 1.5 mol %, 0.7 mol % to 1.2 mol %, or 0.9 to 1.1 mol %. The concentration is based at least in part on the HCl concentration present in the STC process stream. In some embodiments, TCS is added as a separate component to the STC process stream, either before or after the STC process stream enters the superheater. In FIG. 1, TCS 60 is added to the STC process stream 40 before entering the superheater 20. In other embodiments, a desired level of TCS is maintained in the STC process stream by varying conditions in an STC distillation column 70 such that the STC distillate includes a desired level of TCS.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for reducing fouling of a hydrogenation reactor in a hydrochlorosilane production plant comprising a silicon tetrachloride superheater having iron-containing walls and a hydrogenation reactor, the method comprising:
   including at least 0.2 mol % of trichlorosilane in a silicon tetrachloride process stream comprising silicon tetrachloride and hydrogen in the silicon tetrachloride superheater having iron-containing walls, so as to inhibit HCl formation in the silicon tetrachloride superheater when operating at a temperature sufficient to cause a reaction between the silicon tetrachloride and the hydrogen to produce HCl in the absence of the at least 0.2 mol % of trichlorosilane, thereby inhibiting $FeCl_2$ formation by a reaction of HCl and iron in the iron-containing walls and transport of the $FeCl_2$ to the hydrogenation reactor, and thereby reducing iron silicide fouling of the hydrogenation reactor by inhibiting iron silicide formation by a reaction of the silicon tetrachloride, hydrogen, and the $FeCl_2$ that would be formed in the absence of the at least 0.2 mol % of trichlorosilane.

2. The method of claim 1, wherein the at least 0.2 mol % of trichlorosilane is added to the silicon tetrachloride process stream upstream of the silicon tetrachloride superheater.

3. The method of claim 1, wherein including the at least 0.2 mol % of trichlorosilane in the silicon tetrachloride process stream inhibits superheater corrosion by the HCl that would be produced in the absence of the at least 0.2 mol % of trichlorosilane.

4. The method of claim 1, wherein the trichlorosilane is included at a concentration of from 0.2 mol % to 2 mol %.

5. The method of claim 1, wherein the trichlorosilane is included at a concentration of from 0.5 mol % to 1.5 mol %.

6. The method of claim 1, wherein the trichlorosilane is included at a concentration of from 0.9 mol % to 1.1 mol %.

7. The method of claim 1, wherein the silicon tetrachloride process stream further comprises phosphine or other phosphorus-based compounds, and wherein including the at least 0.2 mol % of trichlorosilane further reduces iron phosphide fouling.

8. A method for inhibiting, during hydrochlorosilane production, corrosion of a silicon tetrachloride superheater in a hydrochlorosilane production plant comprising a silicon tetrachloride superheater having iron-containing walls and a hydrogenation reactor thereby reducing fouling of the hydrogenation reactor, the method comprising:

including from 0.2 mol % to 2 mol % of trichlorosilane in a process stream of the silicon tetrachloride superheater, the process stream comprising silicon tetrachloride and hydrogen, wherein presence of the trichlorosilane in the process stream inhibits reaction of the silicon tetrachloride with the hydrogen at an operating temperature of the superheater thereby avoiding formation of HCl, further wherein avoiding the formation of the HCl inhibits a corrosive reaction of HCl with the iron-containing walls of the superheater, in turn reducing formation of $FeCl_2$ and transport of the $FeCl_2$ to the hydrogenation reactor, and further wherein reducing the formation of $FeCl_2$ and transport of the $FeCl_2$ to the hydrogenation reactor reduces iron silicide formation and associated iron silicide fouling of the hydrogenation reactor compared to iron silicide fouling produced by a process stream that does not comprise trichlorosilane.

9. The method of claim 8, wherein including from 0.2 mol % to 2 mol % of trichlorosilane in the process stream comprises adding from 0.2 mol % to 2 mol % of trichlorosilane to the silicon tetrachloride process stream upstream of the silicon tetrachloride superheater.

10. The method of claim 8, wherein the trichlorosilane is included at a concentration of from 0.5 mol % to 1.5 mol %.

11. The method of claim 8, wherein the trichlorosilane is included at a concentration of from 0.9 mol % to 1.1 mol %.

12. The method of claim 8, wherein the silicon tetrachloride process stream further contains phosphine or other phosphorus-based compounds, and wherein including from 0.2 mol % to 2 mol % of trichlorosilane in the process stream further reduces iron phosphide fouling compared to iron phosphide fouling that would be produced in the absence of the 0.2 mol % to 2 mol % of trichlorosilane.

13. The method of claim 8, wherein iron silicide fouling is reduced at distributor orifices of a distributor plate in the hydrogenation reactor compared to iron silicide fouling that would be produced in the absence of the 0.2 mol % to 2 mol % of trichlorosilane.

14. The method of claim 12 wherein iron phosphide and iron silicide fouling is reduced at distributor orifices of a distributor plate in the hydrogenation reactor.

15. A method for reducing fouling of a hydrogenation reactor in a hydrochlorosilane production plant comprising a silicon tetrachloride superheater having iron-containing walls and a hydrogenation reactor, the method comprising:

including at least 0.2 mol % of trichlorosilane in a silicon tetrachloride process stream comprising silicon tetrachloride and hydrogen;

flowing the silicon tetrachloride process stream comprising the at least 0.2 mol % of trichlorosilane into the silicon tetrachloride superheater having iron-containing walls;

heating the silicon tetrachloride process stream comprising the at least 0.2 mol % of trichlorosilane in the silicon tetrachloride superheater to form a heated silicon tetrachloride process stream; and subsequently flowing the heated silicon tetrachloride process stream into the hydrogenation reactor, wherein the heated silicon tetrachloride process stream is mixed with a hydrogen process stream.

16. The method of claim 15, wherein including the at least 0.2 mol % trichlorosilane comprises adding at least 0.2 mol % trichlorosilane to the silicon tetrachloride process stream upstream of the silicon tetrachloride superheater.

17. The method of claim 15, wherein the trichlorosilane is included at a concentration of from 0.2 mol % to 2 mol %.

18. The method of claim 15, wherein the trichlorosilane is included at a concentration of from 0.5 mol % to 1.5 mol %.

19. The method of claim 15, wherein the trichlorosilane is included at a concentration of from 0.9 mol % to 1.1 mol %.

* * * * *